(12) United States Patent
Görich et al.

(10) Patent No.: US 11,819,118 B2
(45) Date of Patent: Nov. 21, 2023

(54) METHOD OF MAKING A UNITARY BRUSH HEAD AND UNITARY TOOTHBRUSH HEAD

(71) Applicant: The Procter & Gamble Company, Cincinnati, OH (US)

(72) Inventors: Gerald Görich, Weiterstadt (DE); Harald Schnizer, Kronberg (DE); Nicolas Götz, Ober-Ramstadt (DE); Klaus Eimann, Zellingen (DE)

(73) Assignee: The Procter & Gamble Company, Cincinnati, OH (US)

(*) Notice: Subject to any disclaimer, the term of this patent is extended or adjusted under 35 U.S.C. 154(b) by 72 days.

(21) Appl. No.: 17/193,145

(22) Filed: Mar. 5, 2021

(65) Prior Publication Data
US 2021/0204683 A1 Jul. 8, 2021

Related U.S. Application Data

(62) Division of application No. 16/131,493, filed on Sep. 14, 2018, now Pat. No. 10,980,336.

(30) Foreign Application Priority Data

Sep. 28, 2017 (EP) .................................... 17193708

(51) Int. Cl.
A46B 1/00 (2006.01)
B29C 45/00 (2006.01)
(Continued)

(52) U.S. Cl.
CPC .................. A46B 9/04 (2013.01); A46B 1/00 (2013.01); A46B 3/00 (2013.01); A46B 3/005 (2013.01);
(Continued)

(58) Field of Classification Search
CPC .. A46B 1/00; A46B 3/00; A46B 3/005; A46B 3/04; A46B 9/04; A46B 2200/1066;
(Continued)

(56) References Cited

U.S. PATENT DOCUMENTS 3,173,177 A    3/1965 Rybka
3,302,230 A  * 2/1967 Poppelmann ........ A46D 1/0238
                                                    15/187
(Continued)

FOREIGN PATENT DOCUMENTS

CA          670147 A      9/1963
CN       101076273 A     11/2007
(Continued)

OTHER PUBLICATIONS

All Office Actions; U.S. Appl. No. 17/547,337, filed Dec. 10, 2021.
(Continued)

Primary Examiner — Randall E Chin
(74) Attorney, Agent, or Firm — Gregory S. Darley-Emerson

(57) ABSTRACT

A toothbrush comprised at least one unitary brush head having a base and at least one filament and extending therefrom and having a free end terminating with a tip, wherein the filament has a length of from 6.0 mm to 20.0 mm between the base and the free end, and wherein the unitary brush head is made from a plastic material that has a melt flow rate of not greater than about 30 g/10 min measured in accordance with ISO 1133.

7 Claims, 10 Drawing Sheets

(51) Int. Cl.

| | | |
|---|---|---|
| *A46D 3/00* | (2006.01) | |
| *A46D 1/00* | (2006.01) | |
| *A46B 3/00* | (2006.01) | |
| *A46B 9/04* | (2006.01) | |
| *A46B 3/12* | (2006.01) | |
| *B29C 45/14* | (2006.01) | |
| *B29C 33/30* | (2006.01) | |
| *B29C 45/56* | (2006.01) | |
| *B29C 45/34* | (2006.01) | |
| *A46B 3/04* | (2006.01) | |
| *B29C 45/26* | (2006.01) | |
| *B29L 31/42* | (2006.01) | |

(52) U.S. Cl.
CPC ............... *A46B 3/04* (2013.01); *A46B 3/12* (2013.01); *A46D 1/0207* (2013.01); *A46D 1/0238* (2013.01); *A46D 1/0269* (2013.01); *A46D 1/0276* (2013.01); *A46D 3/00* (2013.01); *A46D 3/005* (2013.01); *B29C 33/301* (2013.01); *B29C 45/0055* (2013.01); *B29C 45/14385* (2013.01); *B29C 45/2626* (2013.01); *B29C 45/34* (2013.01); *B29C 45/561* (2013.01); *A46B 2200/1066* (2013.01); *B29C 45/2673* (2013.01); *B29L 2031/425* (2013.01)

(58) Field of Classification Search
CPC ...... A46D 1/0207; A46D 1/0276; A46D 3/00; A46D 3/005; B29C 43/003; B29C 45/0055; B29C 45/2626; B29L 2031/425
See application file for complete search history.

(56) References Cited

U.S. PATENT DOCUMENTS

| | | | |
|---|---|---|---|
| 3,357,058 A | 12/1967 | Kutik | |
| 3,467,990 A | 9/1969 | Kutik | |
| 3,847,532 A | 11/1974 | Bischoff | |
| 3,996,330 A | 12/1976 | Jones et al. | |
| 4,422,986 A | 12/1983 | Cole | |
| 5,283,921 A * | 2/1994 | Ng | A61C 17/3481 15/22.1 |
| 5,636,405 A | 6/1997 | Stone | |
| 5,689,850 A * | 11/1997 | Shekalim | A46B 13/02 15/22.1 |
| 7,294,297 B2 | 11/2007 | Weihrauch | |
| 9,210,995 B2 | 12/2015 | Su | |
| 10,010,167 B2 * | 7/2018 | Motahedy | B08B 7/02 |
| 10,245,720 B2 * | 4/2019 | Ptak | A61C 17/3481 |
| 2003/0163884 A1 | 9/2003 | Weihrauch | |
| 2003/0221273 A1 | 12/2003 | Mark | |
| 2005/0006819 A1 | 1/2005 | Weihrauch | |
| 2005/0172439 A1 | 8/2005 | Weihrauch | |
| 2008/0315669 A1 | 12/2008 | Kwon et al. | |
| 2009/0083925 A1 | 4/2009 | Mathiez | |
| 2009/0326415 A1 | 12/2009 | Lim | |
| 2011/0239391 A1 | 10/2011 | Driesen et al. | |
| 2012/0041337 A1 | 2/2012 | Ferguson et al. | |
| 2017/0065071 A1 | 3/2017 | Fritsch et al. | |
| 2018/0317640 A1 | 11/2018 | SchÄr et al. | |
| 2019/0090623 A1 | 3/2019 | Görich et al. | |
| 2019/0381710 A1 | 12/2019 | Eimann et al. | |

FOREIGN PATENT DOCUMENTS

| | | | |
|---|---|---|---|
| DE | 2728672 | A1 | 1/1979 |
| DE | 19925568 | A1 | 12/2000 |
| EP | 0295900 | A2 | 12/1988 |
| EP | 1785056 | A1 | 5/2007 |
| FR | 2 968 907 | A1 * | 6/2012 |
| GB | 868957 | A | 5/1961 |
| WO | 9857570 | A1 | 12/1998 |
| WO | 2008135953 | A1 | 11/2008 |

OTHER PUBLICATIONS

Unpublished U.S. Appl. No. 17/547,337, filed Dec. 10, 2021, to Klaus Eimann et al.

International Search Report and Written Opinion of the International Searching Authority, PCT/US2018/051644, dated Nov. 13, 2018, 10 pages.

All Office Actions; U.S. Appl. No. 16/131,493.

All Office Actions; U.S. Appl. No. 16/131,823.

CM04844FQ Extended EP Search Report and Written Opinion for 17193708.9 ; dated Mar. 22, 2018; 7 pages.

All Office Actions; U.S. Appl. No. 18/140,922, filed Apr. 28, 2023.

U.S. Appl. No. 18/140,922, filed Apr. 28, 2023, to Klaus Eimann et al.

* cited by examiner

METHOD OF MAKING A UNITARY BRUSH HEAD AND UNITARY TOOTHBRUSH HEAD

FIELD OF THE INVENTION

The present disclosure is concerned with a method of manufacturing a unitary (i.e. single-piece) brush head comprising a base and filaments extending from the base.

BACKGROUND OF THE INVENTION

It is known that a unitary brush head comprising a base and filaments extending from the base can be manufactured by injecting molten plastic material into a cavity defining the base and the filaments with a relatively high pressure and applying a holding pressure for a certain time. U.S. Pat. No. 9,210,995 B2 generally describes a unitary brush head and its manufacture.

Simulations and experiments performed by the inventors have shown that long filaments with fine tips particularly suitable for, e.g., tooth brushing represent an issue for plastic injection molding, i.e. the fine structures may not be filled with the molten plastic as the friction between the molten plastic material and the mold walls defining the filaments is relatively high and causes freezing of the molten plastic such that the molten plastic completely solidifies before the fine filament structures are filled.

The present disclosure provides a method of making a unitary brush head such that also fine structures can be reliably filled that cannot be reliably filled with the known plastic injection molding technique.

SUMMARY OF THE INVENTION

In accordance with at least one aspect, a method of manufacturing a unitary brush head is provided, in particular a unitary toothbrush head, the unitary brush head having a base and at least one filament extending from a filament side of the base, the method comprising the steps of injecting molten plastic material into a mold cavity having a pre-base cavity and at least one filament cavity extending from the pre-base cavity, in particular where the plastic material has a melt flow rate of about 30 g/10 min or lower measured in accordance with ISO 1133, compressing the molten plastic material once it is essentially filling the pre-base cavity by impressing at least one punching tool into the molten plastic material from the rear side of the pre-base cavity being opposite to a side from which the at least one filament cavity extends, and filling the at least one filament cavity with the molten plastic material under the continuous impression of the punching tool.

In accordance with at least one aspect, a brush is provided comprising at least one unitary brush head having a base and at least one filament extending therefrom in a unitary manner, wherein the at least one filament has a length between the base and a free end of the filament that is in a range of between 6.0 mm and 20.0 mm, in particular in the range of between 7.0 mm and 15.0 mm, and the diameter of the filament tip is in the range of between 5 µm and 40 µm, in particular in a range of between 8 µm and 30 µm, in particular where the unitary brush head is made from a plastic material that has a melt flow rate of about 30 g/10 min or lower measured in accordance with ISO 1133.

DETAILED DESCRIPTION OF THE INVENTION

Figure 1:
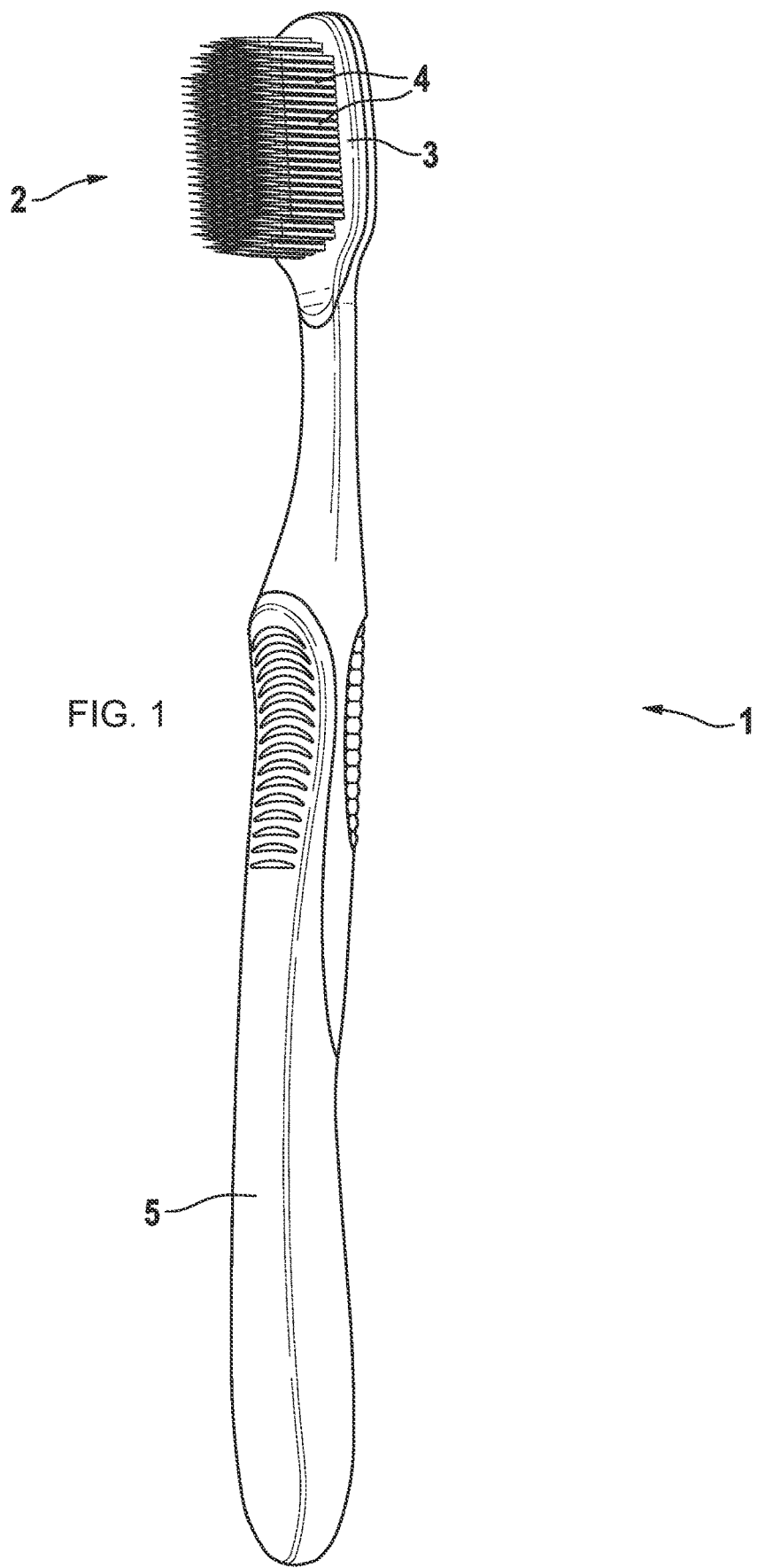
FIG. 1 is a schematic depiction of a toothbrush comprising a unitary brush head.

The present disclosure describes the manufacture of a unitary (i.e. single-piece) brush head comprising a base and at least one filament (in particular a plurality of filaments) extending from the base. The present disclosure also describes a unitary brush head and a brush comprising at least one unitary brush head. As the unitary brush head is a single-piece object made in a single manufacturing step, the filaments and the base are made from the same material and do not have any joining line in-between, indicating that the filaments and the base are made in successive manufacturing steps. A unitary brush head may have a filament density in the range of between 0.1 filaments/mm$^2$ and 5 filaments/mm$^2$, in particular the filament density may be in the range of between 0.5 filaments/mm$^2$ and 2 filaments/mm$^2$. The brush base area from which filaments extend may be in the range of between 1 mm$^2$ and 10.000 mm$^2$, in particular in a range of between 10 mm$^2$ and 1.000 mm$^2$, and further in particular in a range of between 50 mm$^2$ and 500 mm$^2$. A unitary brush head in accordance with the present disclosure is in particular made from a plastic material having a melt flow rate of about 30 g/10 min or lower measured in accordance with ISO 1133. In case of a freedom of choice, the weight to be used in the measurement is a 2.16 kg weight.

It had been found that currently used plastic injection molding technology is not suitable for reliable complete molding of fine filament cavity structures, but that injection compression molding tends to be better suited to fill even the mentioned fine filament cavities. The term "fine" here is in particular directed to filaments having a length as is usual for brushing, in particular tooth brushing, i.e. in a range of between 3 mm and 20 mm, and a filament tip diameter in the range of below 50 µm or below 40 µm or below 35 µm or below 30 µm or below 25 µm or below 20 µm or below 15 µm, in particular being in the range of between 5 µm and 40 µm, further in particular in the range of between 8 µm and 30 µm, and even further in particular in the range of between 10 µm and 25 µm. This insight is the result of simulations and specifically experiments, which are described further below. The present description provides some examples of unitary brush heads suitable for manual toothbrushes, but other shapes and forms can be chosen so that the unitary brush head is suitable for, e.g., replacement brush heads for electric toothbrushes (examples provided as well). It shall also not be excluded that the unitary brush head can be used for other grooming, personal hygiene, or beauty applications such as hair brushing or for a mascara brush.

A filament tip may be flat or spherically rounded or may have a more irregular form. Where a flat filament tip is not circular, the filament tip diameter is defined by a best fit approximation of the flat filament tip with a circle (i.e. a circle for which the same area of the non-circular shape lies outside of the circle as the area inside the circle that is not filled by the non-circular shape—hence the best fit circle has the same area as the irregular shape), where the diameter of the best fit circle is then determining the diameter of the flat filament tip. The same can be applied to determine the diameter of a filament at a certain height level, where then a best fit of a circle with the cross-sectional shape is done. Where the tip is not spherically rounded, the tip diameter is defined by a best fit approximation of the filament tip with a half sphere, where the diameter of the best fit sphere is then the tip diameter.

A further way to characterize the fine filaments that can be filled using ICM technology is given by the length of the filament between an intermediate diameter of a certain value and the tip end. E.g. it had been found that a filament having a diameter of 40 µm or below (which in other words shall mean a filament having a tip cross-sectional area of about 0.00126 mm$^2$) and below can be filled over a length of 300 µm.

The unitary brush head as proposed herein has at least one filament extending from a base in a unitary manner Consequently, the mold cavity defining the unitary brush head comprises at least one filament cavity. In example embodiments, brushes for the mentioned applications have a plurality of unitary filaments, e.g. two filaments, five filaments, or ten filaments. For toothbrushes, the number of unitary filaments may be at least 50 or at least 100 and further at least 150 filaments. The number of filaments may be in the range of between 1 and 1000, in particular in the range of between 5 and 500 and further in particular in the range of between 50 and 300. As will be discussed more in detail, each of the filaments may have the same filament geometry even though in some embodiments, at least one filament of the plurality of filaments has a filament geometry different than the other filaments, and in some embodiments, each of the filaments has a filament geometry different to all other filament geometries of the filaments of the unitary brush head.

In accordance with the present description, a method of making a unitary brush head may comprise that the step of injecting the molten plastic material into the pre-base cavity happens at a pressure that does not exceed the pressure at which the molten material would noticeably fill the filament cavity (or the plurality of filament cavities). That means that the pre-base cavity is filled essentially without filling the filament cavity. This step includes the sub-step of providing a pre-base cavity that has a larger volume than the base of the final unitary brush head and the sub-step of impressing a punching tool into the pre-base cavity to—on the one hand—form the final base cavity and—on the other hand—provide the necessary pressure for forcing the molten plastic material into the fine filament cavities. The pre-base cavity has thus a volume that is given by the volume of the base cavity and the volume of the filament cavity (or filament cavities).

In some embodiments, the injection point at which the plastic material is injected into the mold cavity is located sideways remote from the at least one filament cavity so that the resulting flow direction of the melt is essentially perpendicular to the length extension of the filament cavity or cavities when the melt reaches the filament cavity or cavities.

In some embodiments, the punching tool (e.g. punching stamp) has a punching surface that is impressed into the molten plastic material once the pre-base cavity is filled, which punching surface extends over the locations of the plurality of filament cavities. This may generate a more homogeneous pressure in the melt, in particular as the molten plastic does to some extent not behave like a Newtonian fluid.

In some embodiments, plastic materials suitable for the unitary brush head have a maximum Shore D hardness of below about 70 and/or have a tensile modulus of below about 1200 N/mm$^2$. It shall be understood that the maximum Shore D hardness is measured in accordance with ISO 868 at 23 degrees Celsius and the tensile modulus is measured in accordance with ISO 527 at 23 degrees Celsius as is usual and known in the art (ISO mechanical properties measured at 4.0 mm and specimen for ISO 527 is ISO 1BA). In some embodiments, the Shore D hardness of the material is in a range of between 30 and 70. In some embodiments, the tensile modulus is in a range of between 100 N/mm$^2$ and 1200 N/mm$^2$, in particular in a range of between 500 N/mm$^2$ to 1000 N/mm$^2$, further in particular in a range of between 700 N/mm$^2$ to 900 N/mm$^2$. The plastic material may in particular be a thermoplastic elastomer or a thermoplastic urethane.

In some embodiments, the length of the filament cavity and hence the length of the filament measured between base level and free end of the filament is in a range of between 3.0 mm and 20.0 mm, in particular in a range of between 5.0 mm and 15.0 mm, further in particular in a range of between 6.0 mm and 12.0 mm. The filament may in particular be divided into a base portion and a tip portion, where the base portion and the tip portion may have similar or even identical length.

In some embodiments, a total minimum draft angle of the filament cavity in the range of between 0.4 degrees and 2.0 degrees, in particular of around 1.0 degrees, is achieved for at least half of the length extension of the filament cavity, in particular for a base portion of the filament. A tip portion may taper at larger angles towards the free end of the filament in order to provide a fine filament tip.

The tip or at least one of the tips of a filament may have a diameter in the range of between 5 µm and 40 µm, in particular in the range of between 8 µm and 20 µm. At least one filament may have more than one tip, e.g. two, three, or four or even more tips. The tips may all lie on the same plane parallel to the base plane or at least one of the tips may have a lower or higher lying tip end. E.g. in an example embodiment, a filament has two tips and the free end of the first tip may have a height of about 8 mm above base level and the second tip may have a height of about 10 mm above base level.

In the manufacturing of the unitary brush head, a mold insert (in following usually only named insert) may be used that is assembled from a vertical stack of at least two insert plates, where the filament cavity is defined by either one depression in a face side of one insert plate (and a structureless face side of the abutting other insert plate) or by two cooperating depressions in abutting face sides of the insert plates. This shall not exclude that a projection or several projections may be formed on at least one of the face sides, which projection or projections extend into the cavity formed by the depression to thereby shape the filament cavity. The term "vertical" here means that the filament cavity (filament cavities) is defined by abutting face sides of the insert plates instead of by through-holes (and potentially one blind end hole) in a horizontal stack of insert plates.

Generally, the use of a horizontal stack of insert plates is not excluded for ICM-made unitary brush heads, but in the following, the present application focuses on a vertical stack of insert plates. The more insert plates are used, the more filament cavity "rows" can be defined. For a typical brush head size of between 1 cm and 3 cm in length and width direction and a typical filament distance of 1 mm, about eleven to thirty-one insert plates may be used. In the present document essentially planar insert plates are shown as one example and circular insert plates (or insert rings) are shown as a second example. This shall not be limiting and otherwise curved insert plates are contemplated as well. For planar insert plates, the filaments will be arranged in rows and for circular or ring-like insert plates, the filaments will be arranged in rings.

For otherwise shaped insert plates, the filaments may be arranged on other lines (e.g. an ellipse or a wavy line). It is also contemplated that the insert plates have one curvature on one side and another curvature on the other side. Further, while the filaments shown in the present application all extend essentially perpendicular from the base surface, at least one or several or even all of the filaments may extend from the base at an angle different to about 90 degrees (and in particular, the angle and/or the direction of inclination may be different between two or more of these inclined filaments).

In at least one of the insert plates, a venting cavity may be provided that is in air-conducting connection with a blind-hole end of the at least one filament cavity, which venting cavity has a thickness (i.e. an extension in vertical direction) in the range of between 2 μm and 20 μm, in particular in the range of between 3 μm and 10 μm, and further in particular of about 5 μm. As the ICM technology described herein is able to fill small filament tips, the venting cavity is chosen to be very thin so that the molten plastic material does essentially not enter into the venting cavity. The thickness of the venting cavity may thus be chosen in view of the plastic material and its viscosity or melt flow rate.

The side faces of the insert plates may be pushed together during operation by a compression force to avoid that the pressure applied in the compression stage pushes the insert plates apart. In some embodiments, the compression force is released prior to deforming the unitary brush head to ease the deforming step.

In accordance with at least one aspect, a method of manufacturing a brush is provided that comprises the steps of forming a unitary brush head as discussed herein and connecting the unitary brush head with a brush handle, in particular where the brush handle is formed by injection molding and further in particular wherein the connection between the unitary brush head and the brush handle is established in the injection molding step. The connection may be established by material adhesion or by a form fit, where for the form fit the injected material of the brush handle flows into at least one undercut structure formed at the unitary brush head.

It shall not be excluded that at least one further cleaning element is connected with the unitary brush head in a non-unitary manner, e.g. a rubber-like cleaning element may be attached to the unitary brush head, e.g. by means of injection molding or mechanical connection. Further, it shall not be excluded that an already made brush head portion is provided in the mold cavity as an insert element and that the unitary brush head is then connected with this insert element in the injection compression process.

It shall be understood that a brush in accordance with the present disclosure comprises at least one unitary brush head. The brush head may comprise two or more unitary brush heads that may be identical or that may differ from each other, e.g. they may differ in the color of the plastic material and/or in size, number of filaments, geometry of the filaments etc. A brush may also comprise at least one further cleaning element (e.g. a tuft of bristle filaments made by extrusion technology) that is attached to the brush by other known methods such as anchor tufting (i.e. stapling) or hot tufting technologies (anchor-free tufting technologies).

FIG. 1 is a schematic depiction of an example toothbrush 1 comprising a unitary brush head 2 having a base 3 and filaments 4 extending from the base 3 in a unitary manner and a handle 5 that is connected with the unitary brush head 2. In the shown embodiment, the handle extends underneath the base 3 so that the head portion of the toothbrush 1 is formed by the unitary brush head 2 on the front side (where the filaments are located) and a head portion of the handle 5. The handle 5 may in particular be connected with the unitary brush head 2 in an injection molding process, i.e. a process in which the unitary brush head is inserted into a mold cavity and the handle is then injection molded and connects with the unitary brush head by material adhesion/bonding (requiring respectively affinity between the materials chosen for the unitary brush head and the handle).

In the following, the simulation results of plastic injection molding (PIM) and of injection compression molding (ICM) of a unitary brush head is discussed with reference to FIGS. 2, 3A, and 3B.

Simulation of Plastic Injection Molding (PIM) and Experimental Results

In simulations (using the software tool "Moldflow" available from MF Software GmbH, Darmstadt, Germany) and respective experiments, the filling of a unitary brush head cavity is investigated. The brush head comprises a base and filaments extending at a 90 degrees angle from the base. The base comprises a neck portion remote from the field of filaments. The molten plastic is injected into the neck section with a typical pressure and then flows towards the base portion from which the filaments extend.

Figure 2:
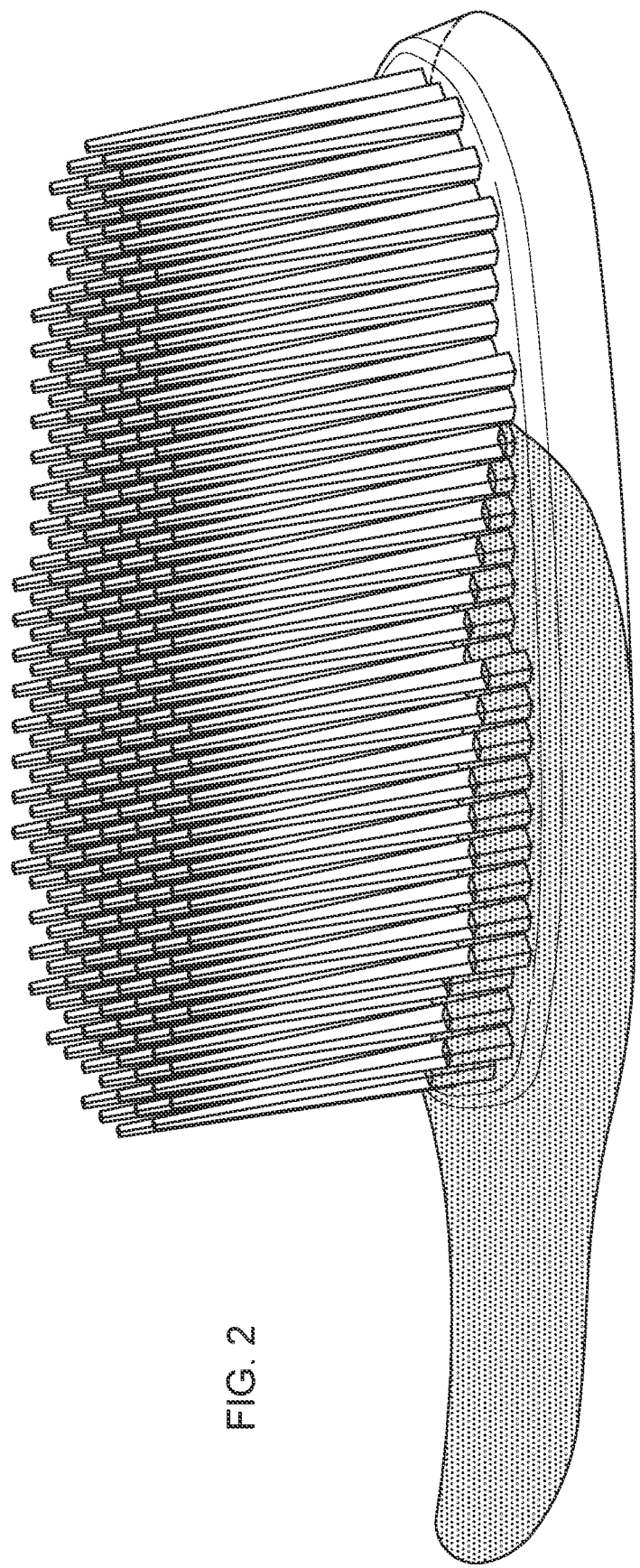
FIG. 2 shows a simulated plastic flow into a cavity defining a unitary brush head for plastic injection molding shown at a time instant where the plastic material is not yet completely filling the base cavity.

FIG. 2 shows a simulation result for a partially filled unitary brush head cavity, where the molten plastic has not yet completely filled the base portion of the cavity. The plastic material is injected via an injection point on the left-hand side of the indicated cavity, which injection point is remote from the field of filament cavities. In the shown intermediate process stage, the molten plastic has already started to flow into the filament cavities that extend from the base cavity. It is now found that the plastic material in the partially filled filament cavities may freeze (i.e. may solidify) under certain conditions so that further filling of the thin filament cavities becomes essentially impossible as the pressure required for filling increases exponentially.

In the simulations, Moplen HP 501M form Lyondell Basell, Huston, USA is used. This Moplen material has a melt flow rate (MFR) measured in accordance with ISO 1133 at 230° C. with a 2.16 kg weight of 100 g/10 min—hence, the Moplen material is a low viscosity and fast flowing material. The maximum pressure that is applied to fill the filament cavities is 470 bar (the simulation does not take into account any pressure losses in the hot runner system or the gating system).

Figure 4:
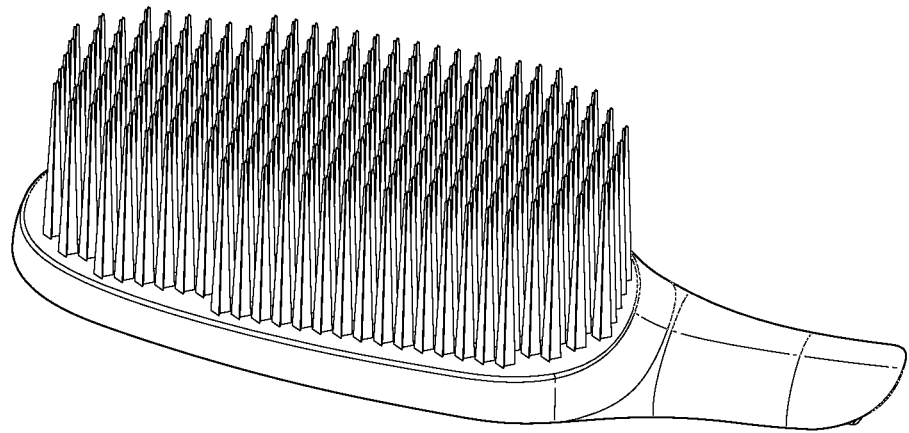
FIG. 4 is a depiction of an incompletely injected unitary brush head made with plastic injection molding.

The simulations are accompanied by experiments in which PIM is used to fill the unitary brush head cavity with the mentioned Moplen material. The experiments are performed with a brush head geometry comprising a regular rectangular arrangement of seven times twenty-six filaments (see FIG. 4 for a depiction of an example unitary brush head made with PIM technology). In PIM, the molten plastic is usually pushed into the mold cavity at a relatively high pressure at which the filament cavities that are first reached by the melt front are partially filled, where the filament cavities that are reached at the end of the injection process are not filled to the same degree due to the pressure gradient in the filling cavity. Once holding pressure is then applied, this high pressure drives the molten material into the remote filament cavities, but the plastic material that has flown in the filament cavities proximal the injection point has a certain probability of freezing/solidifying before the high holding pressure tries to drive the molten material into the filament cavities.

Simulation of Injection Compression Molding (ICM) and Experimental Results

In addition to the simulations and experiments of the plastic injection molding (PIM) of a unitary brush head, simulations and experiments are performed with respect to injection compression molding (ICM) of essentially the same unitary brush head cavity as discussed for PIM. In the ICM simulations and experiments, a punching tool is immersed into the base portion of the unitary brush head cavity (as long as the punching tool is not immersed into the cavity, the base portion of the cavity defines a pre-base and is thus named pre-base cavity).

Figure 3A:
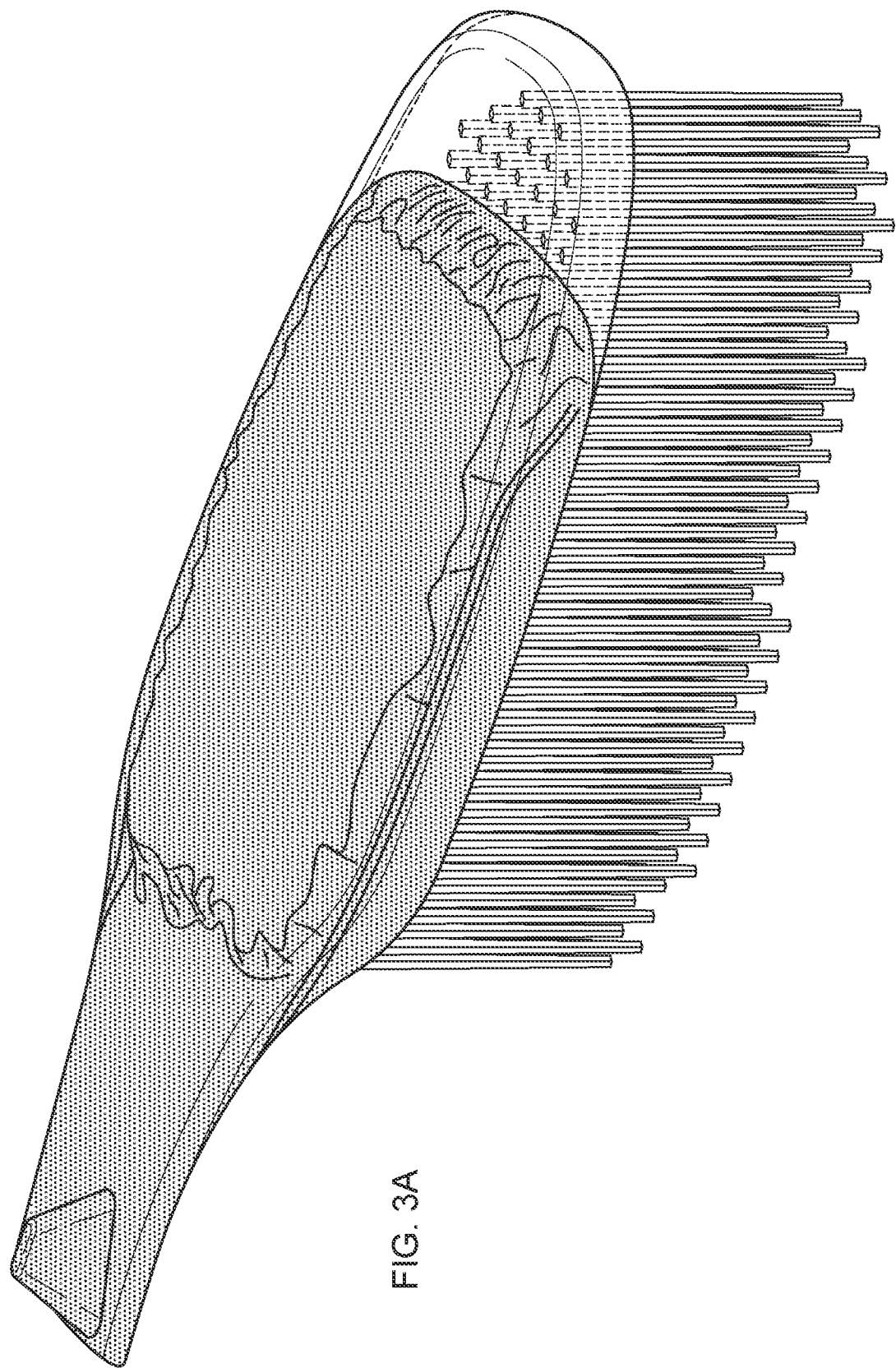
FIG. 3A shows a simulated plastic flow into a cavity defining a unitary brush head for plastic injection compression molding shown at a time instant where the plastic material is not yet completely filling the base cavity.

FIG. 3A shows a simulation result of the ICM process (using again the material properties of Moplen HP 501M) at a point in time where the pre-base cavity is not yet completely filled with molten plastic material. The molten plastic is essentially not flowing into the filament cavities at this stage (which may essentially be because of the larger cross-section of the pre-base cavity leading to a lower needed injection pressure; a skilled person may experimentally confirm at which pressure a given pre-base cavity can be filled without filling the filament cavities for a given geometry and given plastic material). Once the pre-base cavity is filled, the punching tool (in the form of a punching stamp) is impressed into the pre-base cavity from a side opposite to the side from which the filament cavities extend (the compression phase of the process).

Figure 3B:
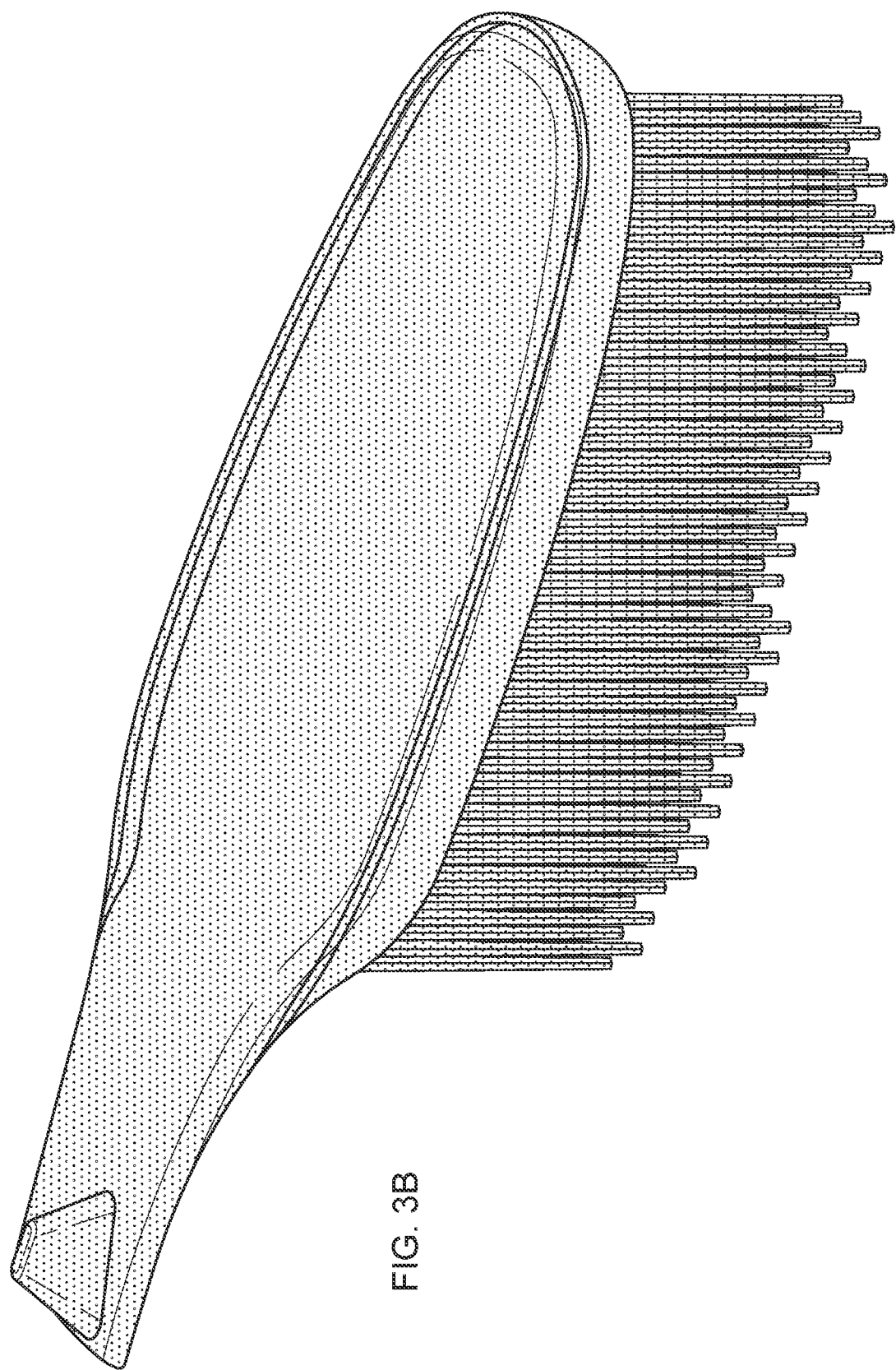
FIG. 3B shows a simulated plastic flow into a cavity defining a unitary brush head for plastic injection compression molding shown at a time instant where a punching tool is completely immersed into the cavity and the plastic material completely fills the base cavity and the filament cavities.

FIG. 3B shows the final stage at which the simulated punching tool is at its end position and the filament cavities are filled up to their blind-hole ends even if very fine tip structures are chosen. The base cavity is thinner by the respective volume that is needed to fill the filament cavities. The dimensions of the filament cavities are discussed in detail further below.

Figure 5:
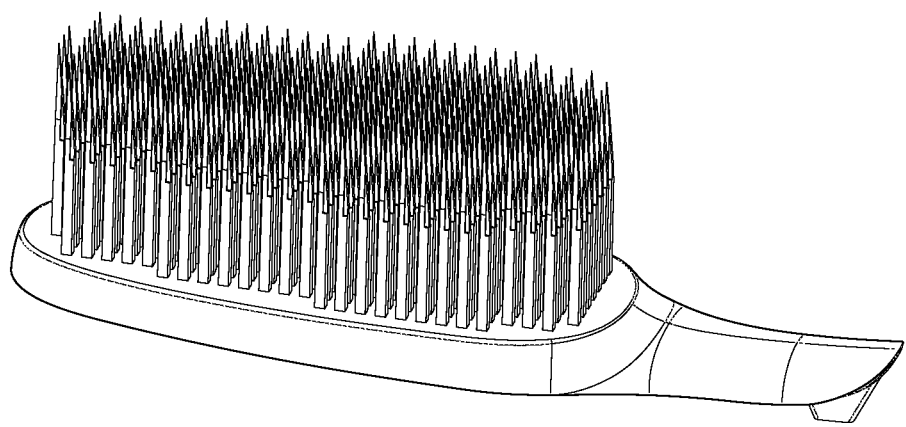
FIG. 5 is a depiction of a completely filled unitary brush head made with injection compression molding.

FIG. 5 shows a picture of an injection compression molded (ICM) unitary brush head. It is confirmed by experiments that ICM is suited to fill the fine filament cavities, in particular it is believed that this holds for plastic materials having a melt flow rate of below 30 g/10 min measured in accordance with ISO 1133 at 230° C. with a 2.16 kg weight, in particular for plastic materials having such a MFR of below 20 g/10 min, further in particular of below 15 g/10 min. A lower value of 4 g/10 min or 5 g/10 min may be chosen, but it is believed that it may be rather difficult to fill the filaments with even lower MFR materials.

These low MFR plastic materials do not flow into the filament cavities when the pre-base cavity is being filled, which enhances the effect already provided by choosing a lower injection pressure than in PIM. While the higher MFR materials are preferred PIM materials as their "water-like" behavior allows a fast filling of the mold cavity, the more "honey-like" behavior of the low MFR materials can well be used in ICM, where a similarly fast filling of the mold cavity is not needed. Moldflow simulations and experiments show good agreement between simulated and experimentally found injection pressure and filling degree, even though the simulations seem to predict a higher filling of the fine filament cavities in PIM as can be proven in the experiments.

Materials used in the experiments include Hytrel 5553FG, Hytrel 6359FG (both Hytrel materials being available from DuPont, Wilmington, USA), and a mixture of 50% by volume Allruna W40D193 (available from ALLOD Werkstoff GmbH & Co. KG, Burgbernheim, Germany) and 50% by volume Moplen RP2802 (available from Lyondell Basell, Houston, USA). The Hytrel materials have a Shore D hardness of 55 (Hytrel 5553FG) and of 63 (Hytrel 6359FG). Further, Hytrel 5553FG has a tensile modulus of 170 and a melt flow rate of 7 g/10 min measured at a temperature of 230° C. with a 2.16 kg weight and Hytrel 6359FG has a tensile modulus of 260 and a melt flow rate of 9 g/10 min measured at 230° C. with a 2.16 kg weight. Based on objective hardness measurements and also based on subjective investigation of optical resetting properties of the ICM-made unitary brush heads and based on practical use tests, Hytrel 6359FG is found to be more suitable for toothbrushing applications than the other mentioned materials. But it is believed that the filament geometry has a great effect on the suitability of a given material. Generally, it is believed that plastic materials having a Shore D hardness of below 70 tend to be better suitable than other plastic materials and/or materials having a tensile modulus of below 1200 N/mm$^2$ tend to be better suitable. These material parameters are in particular relevant for mechanical performance of the unitary brush head, e.g. wear and form stability.

Dimensions of the Filaments of a Unitary Brush Head

In the experiments mentioned above, two different filament geometries are used to investigate the ICM technology. A first investigated filament geometry has a somewhat polygonal cross section at the base that is defined by two triangles attached offset by 0.17 mm along one edge, which base fit into a rectangle having a length of 0.9 mm and a width of 0.69 mm. This filament ends at a height of 10 mm above base level in two separate tips, where the triangular tips define a circle inside the tip triangle of 70 µm. A draft angle of 1.55 degrees is used along the full length of 10 mm.

Figure 10:
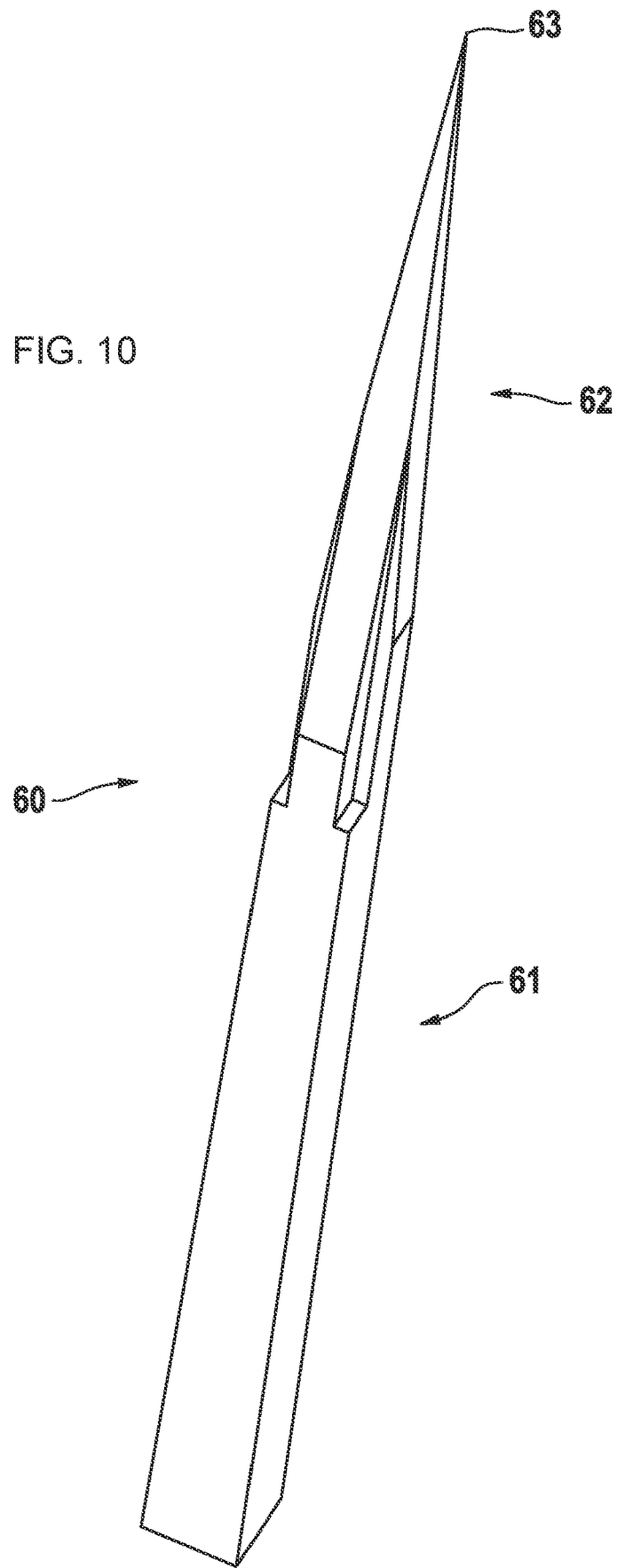
FIG. 10 is a depiction of an example filament of a unitary brush head.

A second investigated filament geometry (see FIG. 10 for a depiction of the respective filament) comprises a filament 60 of a total length of 10 mm that is divided into a base portion 61 having a length of 5 mm and a tip portion 62 having a length of 5 mm as well. The base portion 61 has a quadratic cross-sectional shape on the base level of 0.5 mm times 0.5 mm. The base portion 61 tapers on three sides with a draft angle of 0.5 degrees. In the tip portion 62, the cross-sectional shape is reduced to a T-shaped cross section and the tip portion 62 tapers towards a flat tip 63 of quadratic cross section having an edge length of 10 µm, i.e. a cross-sectional area of 10 µm times 10 µm=0.0001 mm² and a best-fit circle diameter of 11.28 µm.

Generally, it is found that filaments, and hence the respective filament cavities, may be divided into a base portion and a tip portion. In some embodiments, the base portion has a length of about 5 mm measured between the base surface and the filament height t at which the tip portion starts, but the length of the base portion may lie in a range of between 2 mm and 15 mm. The base portion may be designed to have a cross-sectional area at the base level in the range of about 0.1 mm² and 5.0 mm², in particular in the range of about 0.15 mm² and 2.0 mm², and further in particular in the range of about 0.2 mm² and 1.5 mm². In some embodiments, the cross-sectional shape of the base portion is quadratic or rectangular or circular or ellipsoidal/oval. The base portion may have a draft angle on at least one side in the range of between 0.2 degrees to 2 degrees, in particular in the range of between 0.4 degrees to 1 degree. The tip portion may have a length of about 5 mm, but may generally have a length in the range of between 2 mm and 15 mm. The tip portion may taper much faster (i.e. at a greater angle) towards the tip. The tip end of the filaments may be flat or semispherical.

While not intended to be a limiting remark, filament geometries based on a frustum of pyramid (i.e. truncated pyramid) at the base of the filament may be formed only into one side of an insert plate. Filament geometries based on a frustum of cone (i.e. truncated cone) at the base of the filament may be formed in two oppositely arranged sides of two insert plates. As discussed before, other base portion geometries are possible as well.

Figure 6:
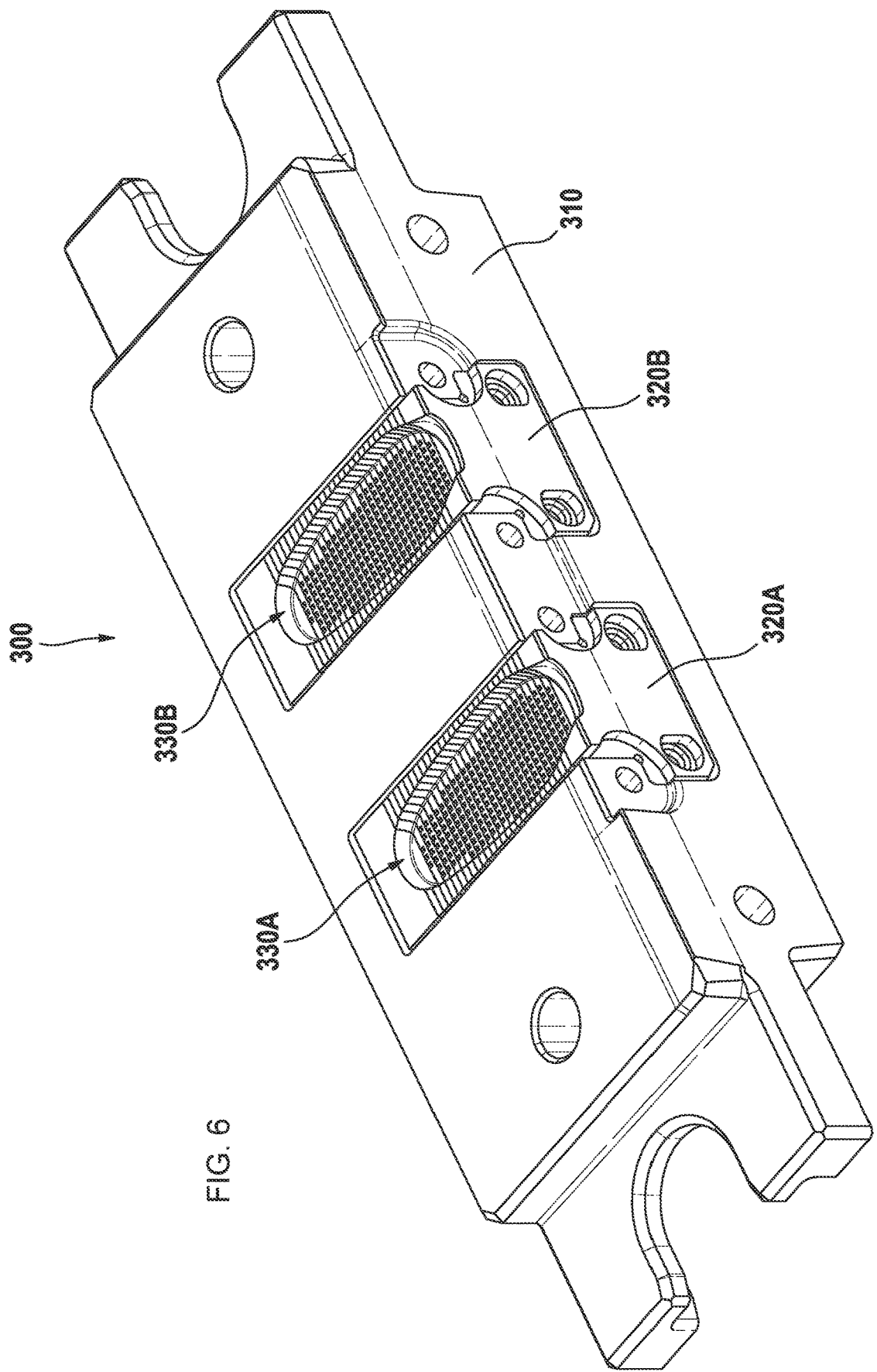
FIG. 6 is a depiction of a mold bar comprising two mold inserts.

FIG. 6 is a depiction of a moldbar 300 having two inserts 320A and 320B disposed in a frame 310. The moldbar 300 will be inserted into a mold plate of a mold half of an injection molding machine. The shown moldbar 300 is suitable for PIM and ICM. Each of the inserts 320A and 320B defines a first cavity portion 330A and 330B, respectively, of a unitary brush head, where the first cavity portion 330A, 330B defines filament cavities and at least a portion of the base (or-pre-base) cavity. While, in the present case, the moldbar 300 has two inserts 320A, 320B, a moldbar in general may have any other number of inserts, e.g., one insert, three inserts, four inserts, eight inserts, ten inserts, etc.

While it is described that the moldbar 300 is inserted into a mold plate of a mold half, more than one moldbar may be inserted into a mold plate, e.g., two moldbars, three moldbars, four moldbars, etc. While it is here shown that the inserts 320A and 320B are essentially identical, each of the inserts of a moldbar may be different to the other inserts, i.e. may define a different unitary brush head. When several moldbars are inserted into one mold plate, each of the moldbars may be different from the other moldbars (i.e. may have a different number of inserts).

Depending on the size of the unitary brush head, a single mold plate may have eight or ten or twelve or 16 or 20 or 24 or 32 or 64 etc. inserts so that in one single injection shot, the respective number of unitary brush heads can be made. For sake of completeness, it shall not be excluded that an insert is directly placed in a mold plate instead of using an additional mold bar. In a set of different moldbars, each moldbar may always have the same outer shape, but the different moldbars may comprise differently sized inserts. Hence, just the moldbar needs to be replaced, but still the same moldplate can be used.

Figure 7:
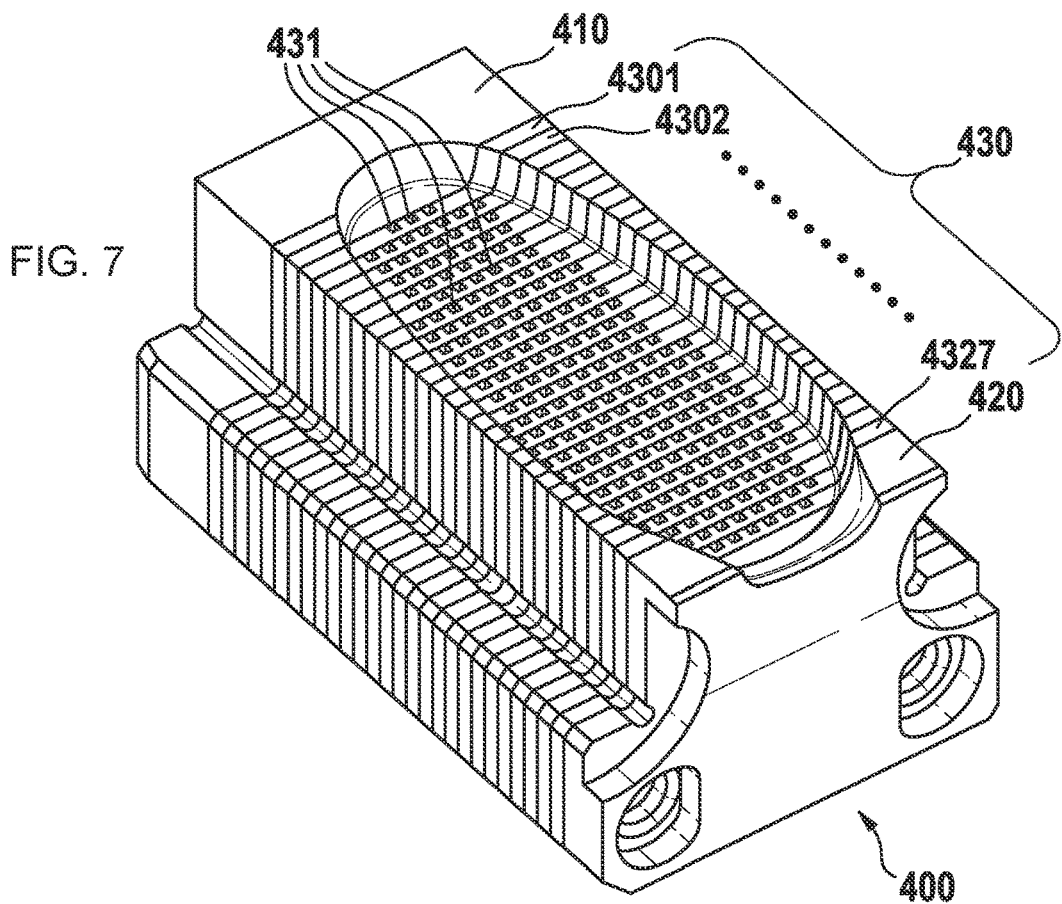
FIG. 7 is a depiction of an exemplary mold insert assembled from a stack of insert plates.

FIG. 7 is a depiction of an insert 400 that may be inserted into the frame 310 shown in FIG. 6. The insert 400 comprises a vertical stack of insert plates 410, 430, and 420. A plurality of structured insert plates 430 is sandwiched between two end plates 410 and 420. In the shown embodiment, 27 structured insert plates 430 labelled 4301 to 4327 are used to define the filament cavities 431. The thickness of the structured insert plates 430 may be in the range of between 0.7 mm to 2.0 mm. A thickness of about 1.0 mm leads to a distance of the filaments in vertical direction of 1.0 mm, which may be considered a sensible value for a unitary brush head used for tooth brushing.

While the structured insert plates 431 shown have the same thickness in vertical direction, the thickness of the structured insert plates may vary, e.g., from 0.7 mm to 2.0 mm. While the structured insert plates shown have a first face side that comprises the structures defining the filament cavities and a second face side without any structures, the insert plates in general may include insert plates structured on both face sides and/or may comprise non-structured insert plates, which structured and non-structured insert plates may be alternately arranged, but any other mixture of one-side structured insert plates, two-side structured insert plates, and not structured insert plates may be used. While the end plates 410 and 420 are shown as unstructured end plates, at least one of the end plates may be structured as well.

Figure 8:
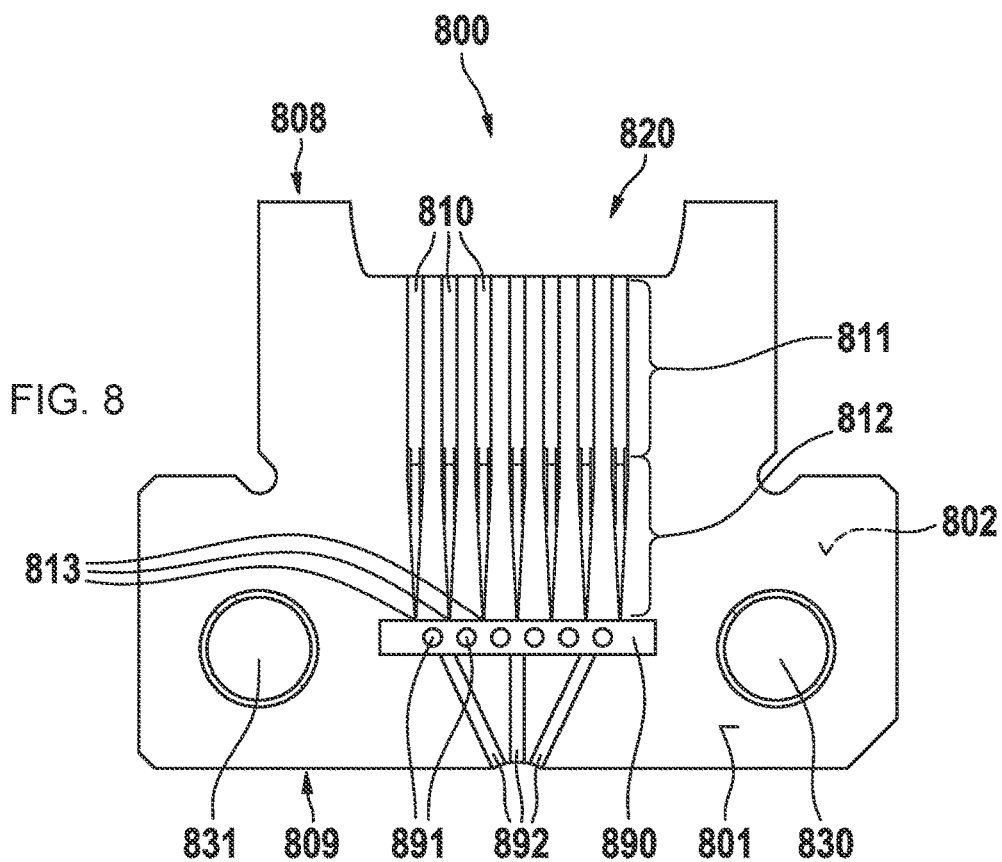
FIG. 8 is a front view onto a front side of an example insert plate structured in accordance with the present description.

FIG. 8 is a front view onto a face side of a structured insert plate 800 as may be used in an insert 400 as shown in FIG. 7 or an insert 320A or 320B shown in FIG. 6. The insert plate 800 has a structured front face side 801 and a further back face side 802 (not visible) that may be structured but may as well be unstructured. The insert plate 800 has a cut-out 820 in its top area 808, which cut-out 820 serves to define a portion of the base (or pre-base) cavity. Further, the insert plate 800 has circular cutouts 830 and 831 that serve to align a plurality of insert plates by means of rod elements that in the assembled state extend through the circular cut-outs 830 and 831, respectively. A plurality of seven partial filament cavities 810 are provided in the front face side 801 of the insert plate 800. In some embodiments, in an assembled state an unstructured face side of another insert plate abuts the structured front face side 801 of the shown insert plate 800 and the partial filament cavities 810 together with the unstructured face side of the other insert plate define the respective filament cavities.

In some embodiments, the other insert plate comprises at least one partial filament cavity that coincides in position with one of the partial filament cavities 810 of the shown insert plate 800 and together form a filament cavity. Generally, a structured insert plate has at least one partial filament cavity in one of its face sides (and hence, a non-structured insert plate has just plain face sides). While here a plurality of seven partial filament cavities are shown, any number of partial filament cavities may be provided in a structured face side of an insert plate. Further, while here all partial filament cavities 810 have the same form, at least one of the partial filament cavities may have a form different to the form of the other partial filament cavities, and in particular all of the partial filament cavities may be different to each other.

The shown embodiment indicates that the partial filament cavities 810 are divided into a base portion 811 and a tip portion 812. The length of the base portion 811 and the length of the tip portion 812 may be similar (i.e. the length of the base portion may be 40% or 60% of the total length of the partial filament cavity) or may be even identical. The base portion may have a total de-forming inclination angle (i.e. draft angle) of below 1 degree, whereas the tip portion 812 may taper much faster towards the blind-hole ends 813 of the partial filament cavities. It had been found that such a divided filament cavity structure, where the base portion stays essentially identical and the tip portion is then defining the particular structure of the filament to be made tends to have good filling properties and good deforming properties.

The insert plate 800 further comprises a venting cavity 890 that is provided in the front face side 801 of the insert plate 800. The venting cavity 890 is in air-conducting connection with each of the blind-hole ends 813 of the partial filament cavities 810. The venting cavity 890 may have a depth in the range of between 2 µm and 10 µm, in particular in a range of between 3 µm and 7 µm, and further in particular of about 5 µm. The venting cavity 890 may in particular be made by laser ablation technology and in particular by application of ultra-short laser pulses. The venting cavity 890 has a very small depth.

As the ICM technology, as described, is suitable for filling the filament cavities up the very front tip having a diameter in the range of between 40 µm down to about 5 µm, the air-conducting connection to the venting cavity 890 had to be relatively thin (where the thickness may be chosen for a particular filament geometry and material—the thickness of the venting cavity used in the above described experiments is 5 µm). Even under the high pressure applied by the punching tool as described, the molten plastic material will essentially not enter into the venting cavity 890 as the pressure required to fill this small cavity is then too high. Obviously, even such a small connection between the blind-hole ends 813 of the partial filament cavities 10 and the venting cavity 890 is sufficient for de-aeration of the filament cavities in the assembled state.

Within the venting cavity 890 several stopper elements 891 are provided, where no material is ablated to form the venting cavity 890. In the assembled state and in use, the insert is held under pressure and the insert plates may tend to deform and to enter into the small venting cavities. This deformation is effectively avoided by providing the stopper elements 891. In the shown embodiment, venting channels 892 connect the venting cavity 890 and the outside of the insert plate 800 at the bottom area 809. The venting channels 892 may be made by any conventional material ablation technology, which causes lower costs than making a laser-ablated venting cavity 890 that extends to the bottom area 809 of the insert plate 800.

Figure 9:
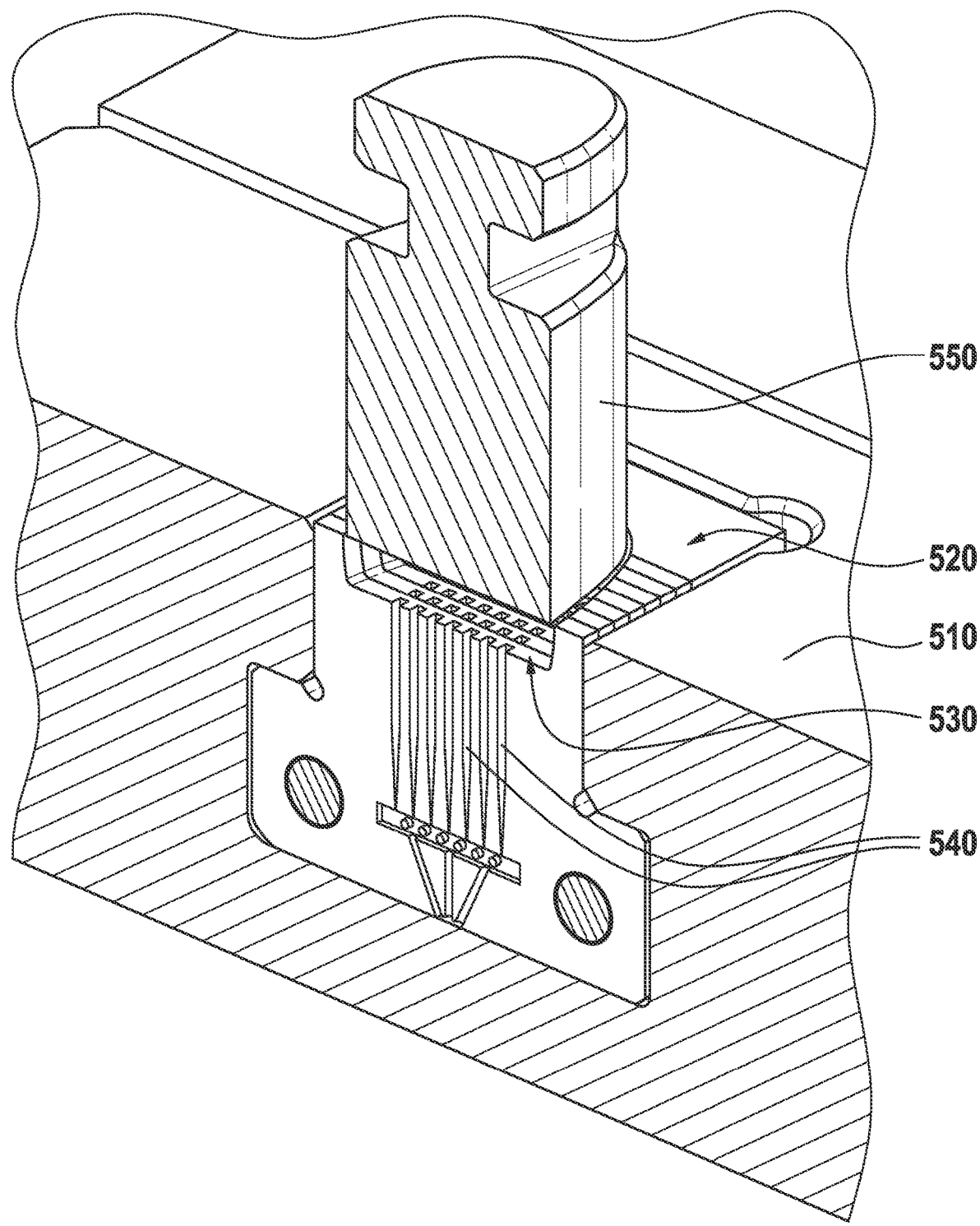
FIG. 9 shows a cross-sectional view of a moldbar having a mold insert and of a punching tool in a start position.

FIG. 9 is a cross-sectional depiction of a moldbar 510 with mold insert 520 defining in particular a pre-base cavity 530 and of a punching tool 550 realized as a punching stamp that is arranged for being immersed into the pre-base cavity 530 once it is filled with molten plastic material in order to push the molten plastic into the fine filament cavities 540. In the shown embodiment, the punching tool 550 has essentially the same shape as the pre-base cavity so that the punching tool 550 extends over all filament cavities 540. It is noted that for sake of presentability, the venting cavity at the end of the filament cavities is shown with a dramatically increased depth. As previously discussed, the depth of the venting cavity is in the range of a few micrometers.

In some embodiments, the punching tool is realized by one of the mold halves and the mold halves are then moved relatively towards each other to generate the needed pressure that drives the molten plastic into the at least one filament cavity. In some embodiments, the punching tool is an element that can be independently moved with respect to the mold halves as is described.

In some embodiments, the pressure at which the molten plastic material is injected into the mold cavity is chosen such that the at least one filament cavity is essentially not filled, i.e. the injection pressure is chosen so low that the molten plastic material is not pushed into the filament cavities. In other words, if a pressure value P is needed to at least partially fill the filament cavity, than the pressure with which the plastic is injected into the base cavity is chosen such that the pressure in the molten plastic material at the location of the filament cavity is below this pressure P. This assures that the molten plastic material does not already solidify in the thin filament cavities prior to filling the whole filament cavity under the pressure of the punching tool. While the molten plastic may form a thin skin of relatively cool plastic material extending over the filament cavities prior to immersing the punching tool into the pre-base cavity, the high pressure exerted by the punching tool will push the still liquid plastic material through the cooled skin into the filament cavities. Because of the sudden high pressure, the molten plastic material is filling the thin filament cavity up to the small blind-hole end. In some embodiments, the at least one filament cavity has a height in the range of between 3.0 mm and 20.0 mm, in particular of between 8.0 mm and 12.0 mm, and has a blind-hole end diameter in the range of between 5 µm and 40 µm, in particular of between 8 µm and 20 µm.

While here the term "blind-hole end" of the filament cavity is used, this shall not exclude that the filament cavity has a venting structure for guiding air out of the filament cavity. Such a venting structure may in particular have a venting cavity that is in air-conducting connection with the blind-hole end of the filament cavity. The thickness of the venting cavity at least at the location where the venting cavity is in air-conducting connection with the blind-hole end of the filament cavity is in the range of between 2 µm and 10 µm, in particular in the range of between 3 µm and 7 µm, and further in particular of around 5 µm.

As mentioned before, the herein described method to manufacture a unitary brush head may be used to manufacture unitary brush heads suitable for replacement brushes for electric toothbrushes. In particular, a unitary brush head having a circular or elliptical/oval shape may be made and may then be connected with a drive section comprising a coupling portion. The filaments may be arranged on vertices of a rectangular lattice, as is previously described, or the filaments may be arranged in rings. For the latter arrangement, insert plates may be provided having a circular or elliptical/oval shape (in particular, e.g. two semi-circular insert plates may form together a circular insert plate).

Figure 11A:
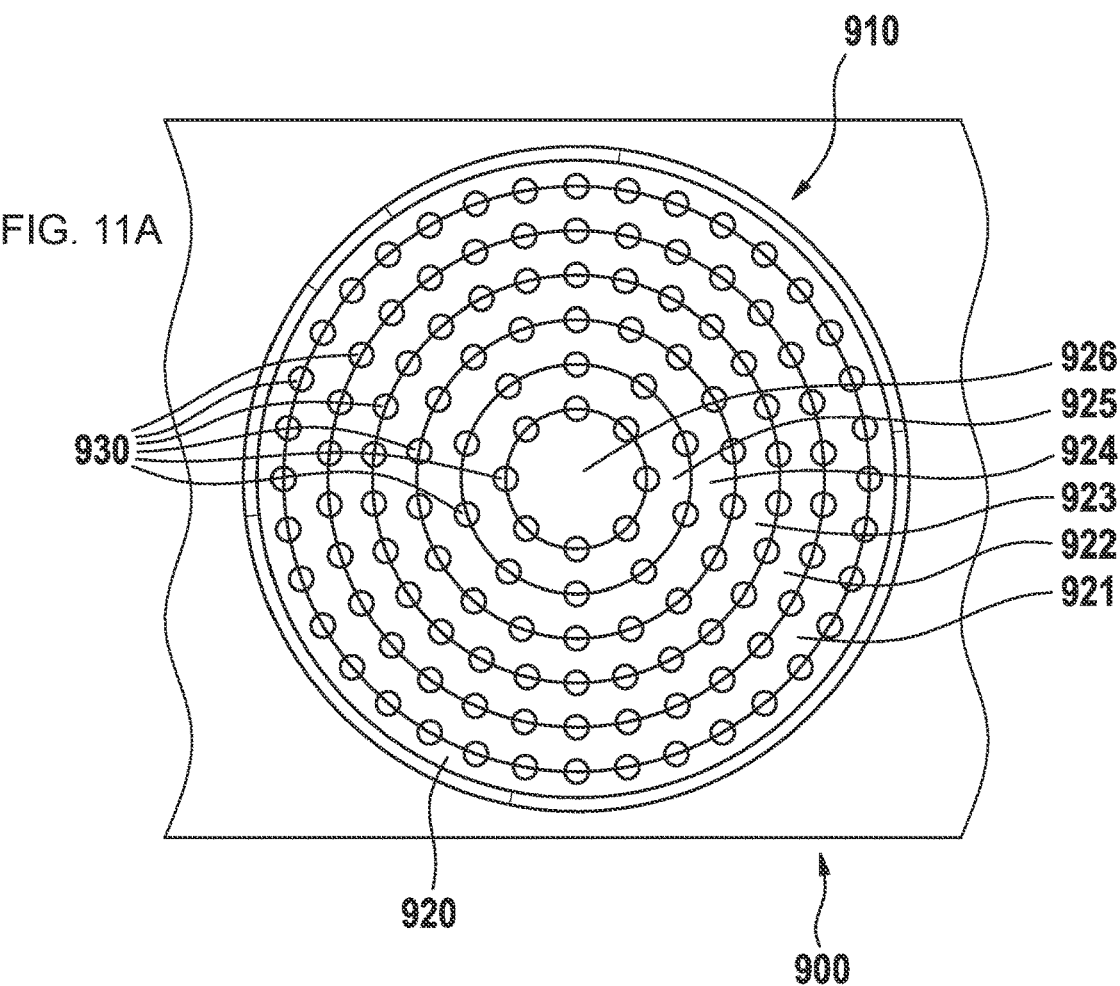
FIG. 11A is a depiction of a moldbar comprising another embodiment of a mold insert made from stacked insert rings.
Figure 11B:
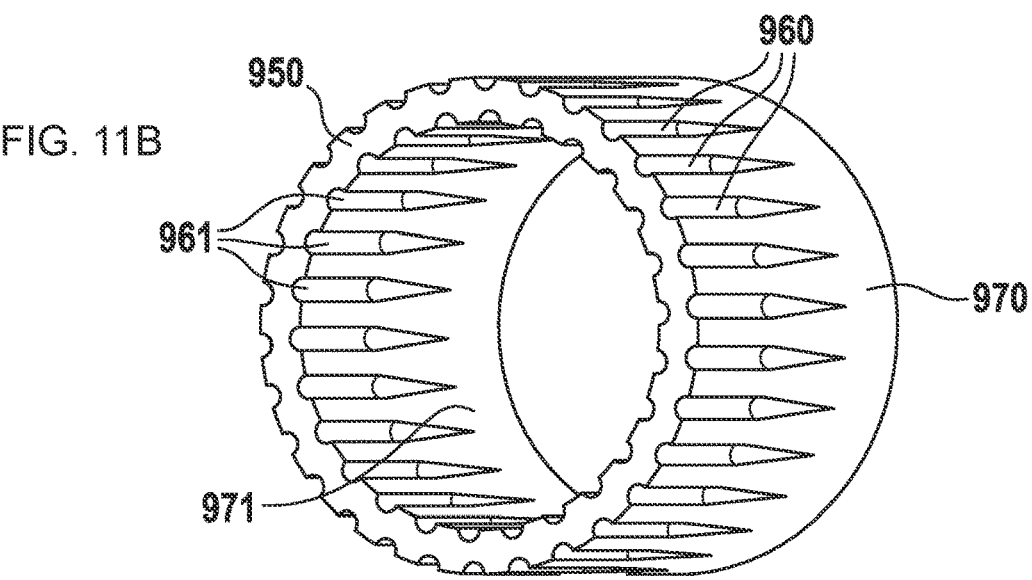
FIG. 11B is a depiction of a single exemplary insert ring.

FIG. 11A is a top view onto a portion of an example mold bar 900 comprising a mold insert 910 that comprises several essentially ring-like (here: ellipsoidal) insert plates 920, 921, 922, 923, 924, 925, and 926 that form a plurality of filament cavities 930 so that the filaments are finally essentially arranged on rings. FIG. 11B is a perspective view onto a single example insert ring 950 that may be used in a mold insert 910 as shown in FIG. 11A. The insert ring 950 comprises partial filament cavities 960 and 961 formed on the outer face side 970 of the insert ring and on the inner face side 971 of the insert ring 950. As is shown in FIG. 11A, the partial filament cavities 960 and 961 may cooperate with respective partial filament cavities in abutting ring-like insert plates to form the filament cavities for forming a unitary brush head. In the example shown in FIG. 11A, the symmetrically arranged partial filament cavities of the stacked ring-like insert plates automatically align due to the ellipsoidal form of the insert plates. In case of circular insert plates, the insert plates may have at least one cooperating groove and projection pair for aligning the insert plates. Again, while FIGS. 11A and 11B show insert plates having a structured outer and a structured inner side face, in other embodiments, only one of the side faces may be structured to form filament cavities. Essentially the same applies that is previously described in connection with the planar insert plates.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A unitary brush head for an electric toothbrush, the unitary brush head having a base driven by a drive section of the electric toothbrush,
   wherein the base has a plurality of filaments extending therefrom and having a free end terminating with a tip,
   wherein each of the plurality of filaments has a length of from 6.0 mm to 20.0 mm between the base and the free end,
   wherein the unitary brush head is made from a plastic material that has a melt flow rate of not greater than about 30 g/10 min measured in accordance with ISO 1133,
   wherein the base has a circular or elliptical shape, and
   wherein the plurality of filaments are arranged on the base in a plurality of concentric rings.

2. The unitary brush head of claim 1, wherein the at least one filament has a tip having a diameter of not greater than about 40 μm for a length of at least about 200 μm measured from the free end of the filament.

3. The unitary brush head of claim 2, wherein the tip has a diameter from 8 μm to 30 μm.

4. The unitary brush head of claim 1, wherein the at least one filament has a tip having a diameter of less or equal to about 40 μm for a length of not greater than 250 μm measured from the free end of the filament.

5. The unitary brush head of claim 1, wherein the at least one filament has a tip having a diameter of not greater than about 40 μm for a length of at least about 300 μm measured from the free end of the filament.

6. The unitary brush head of claim 1, wherein the unitary brush head is made by a method including the steps of:
   injecting a molten plastic material into a mold cavity having a pre-base cavity and at least one filament cavity extending from the pre-base cavity;
   compressing the molten plastic material once it is essentially filling the pre-base cavity by impressing at least one punching tool into the molten plastic material from a rear side of the pre-base cavity being opposite to a side from which the at least one filament cavity extends;
   filling the at least one filament cavity with the molten plastic material under a continuous impression of the punching tool.

7. The unitary brush head of claim 1, wherein the plastic material comprises a thermoplastic elastomer or a thermoplastic urethane having a Shore D hardness of below about 70 measured in accordance with ISO 868, and wherein the plastic material has a tensile modulus of below about 1200 N/mm$^2$ measured in accordance with ISO 527.

* * * * *